US007571910B1

(12) United States Patent
Launzel

(10) Patent No.: US 7,571,910 B1
(45) Date of Patent: Aug. 11, 2009

(54) DUAL WHEEL ROULETTE GAME APPARATUS AND METHOD OF USE

(75) Inventor: Edward A. Launzel, 4538 Regalo Bello St., Las Vegas, NV (US) 89135

(73) Assignee: Edward A. Launzel, Las Vegas, NV (US)

( * ) Notice: Subject to any disclaimer, the term of this patent is extended or adjusted under 35 U.S.C. 154(b) by 0 days.

(21) Appl. No.: 12/136,575

(22) Filed: Jun. 10, 2008

(51) Int. Cl.
*A63F 5/02* (2006.01)
*A63F 13/00* (2006.01)

(52) U.S. Cl. .......................... 273/142 HA; 273/142 H; 273/142 E; 273/274; 273/138.1; 273/138.2; 463/17; D21/375

(58) Field of Classification Search .......... 273/142 HA, 273/142 H, 142 E, 142 F, 142 G, 274, 138.1, 273/138.2; 463/17; D21/375
See application file for complete search history.

(56) References Cited

U.S. PATENT DOCUMENTS 5,540,442 A 7/1996 Orselli et al.
5,636,838 A * 6/1997 Caro ...................... 273/142 E
5,743,798 A * 4/1998 Adams et al. ................ 463/17
6,164,647 A 12/2000 Chee
6,217,022 B1 4/2001 Astaneha
6,663,106 B1 * 12/2003 Cosmi .................... 273/142 E
6,890,255 B2 5/2005 Jarvis et al.
7,204,488 B2 4/2007 Ilievski
7,281,978 B2 * 10/2007 Moshal ........................ 463/17
2002/0167126 A1 11/2002 Herman De Raedt et al.
2005/0215307 A1 9/2005 Jarvis et al.
2006/0170155 A1 8/2006 Silverman

FOREIGN PATENT DOCUMENTS

GB 2431362 A 4/2007

* cited by examiner

*Primary Examiner*—Benjamin H Layno
(74) *Attorney, Agent, or Firm*—Edward A. Launzel

(57) ABSTRACT

A dual wheel roulette game apparatus and method of use is disclosed. An apparatus for facilitating a roulette game includes two distinct, independent roulette wheels. Numbered compartments on each wheel designate conventional roulette numbers (e.g., 1-36) such that a number has two chances to occur. Additional compartments are added to each wheel to increase the number of wagering opportunities. One wheel may have more compartments than the other such that a jackpot wager and payout may be based on outcomes associated with lower probability outcomes.

20 Claims, 4 Drawing Sheets

DUAL WHEEL ROULETTE GAME APPARATUS AND METHOD OF USE

FIELD OF THE INVENTION

The embodiments of the present invention relate to a dual wheel roulette game apparatus and method of using the same to play a roulette game.

BACKGROUND

As gaming continues to enjoy widespread acceptance, casinos are in constant need of new games of chance to retain experienced patrons and to attract new patrons. Even though electronic gaming devices (e.g., slot machines) now account for more revenue than table games, many players continue to prefer the skill requirements and personal interaction of live gaming. Therefore, live gaming is an integral part of the success of any casino.

Nonetheless, as floor space for table games continues to be encroached by electronic gaming machines, casinos must be very selective with the new live games they place on their casino floor. Accordingly, because players prefer games with familiar concepts, casinos are more apt to consider new games which are based, at least in part, on existing popular games (e.g., Roulette).

More particularly, roulette is a game that has been around for decades and continues to command large crowds. One drawback to roulette is the inability to generate large payouts without the necessity of large wagers. Another drawback is the lack of excitement associated with the current roulette wheel mechanism.

Consequently, there continues to be a need for new roulette game apparatus for facilitating a roulette-style game and which provides players with a small jackpot wager and which is otherwise more exciting than conventional roulette.

SUMMARY

Accordingly, a first embodiment of the present invention is a method of conducting a roulette game comprising: a method of conducting a roulette game comprising: allowing players to place wagers on outcomes of the roulette game as generated by a first roulette wheel and a second roulette wheel forming a single unit; once wagers have been placed, spinning a roulette ball about said first roulette wheel and said second roulette wheel; and resolving said wagers based on a roulette wheel compartment on either said first roulette wheel or said second roulette wheel into which said roulette ball lands.

One apparatus embodiment of the present invention comprises: a first roulette wheel; a second roulette wheel; and wherein the first and second roulette wheels form a single unit and are independent of one another such that the first and second roulette wheels may spin independently, the first roulette wheel and second roulette wheel having a series of numbered and/or colored compartments adapted to receive a roulette ball. In one embodiment, the first roulette wheel is centrally positioned relative to said second roulette wheel such that said second wheel has a greater diameter than the first roulette wheel.

Another apparatus embodiment of the present invention comprises: a first roulette wheel centrally positioned relative to a second roulette wheel, said first and second roulette wheels configured to spin independently of one another; and a series of roulette ball compartments on each roulette wheel, said compartments of said first roulette and said second roulette wheel positioned adjacent to one another such that a roulette ball is able to land in any compartment on either said first roulette wheel or said second roulette wheel.

In one embodiment of the present invention, the dual roulette wheels include additional compartments not found on conventional roulette wheels thereby creating more wagering opportunities for players and, as detailed below, a jackpot wager and payout. In one embodiment of the present invention, players have two chances to win on the same number assuming it is on both wheels.

Other variations, embodiments and features of the present invention will become evident from the following detailed description, drawings and claims.

DETAILED DESCRIPTION

Figure 1:
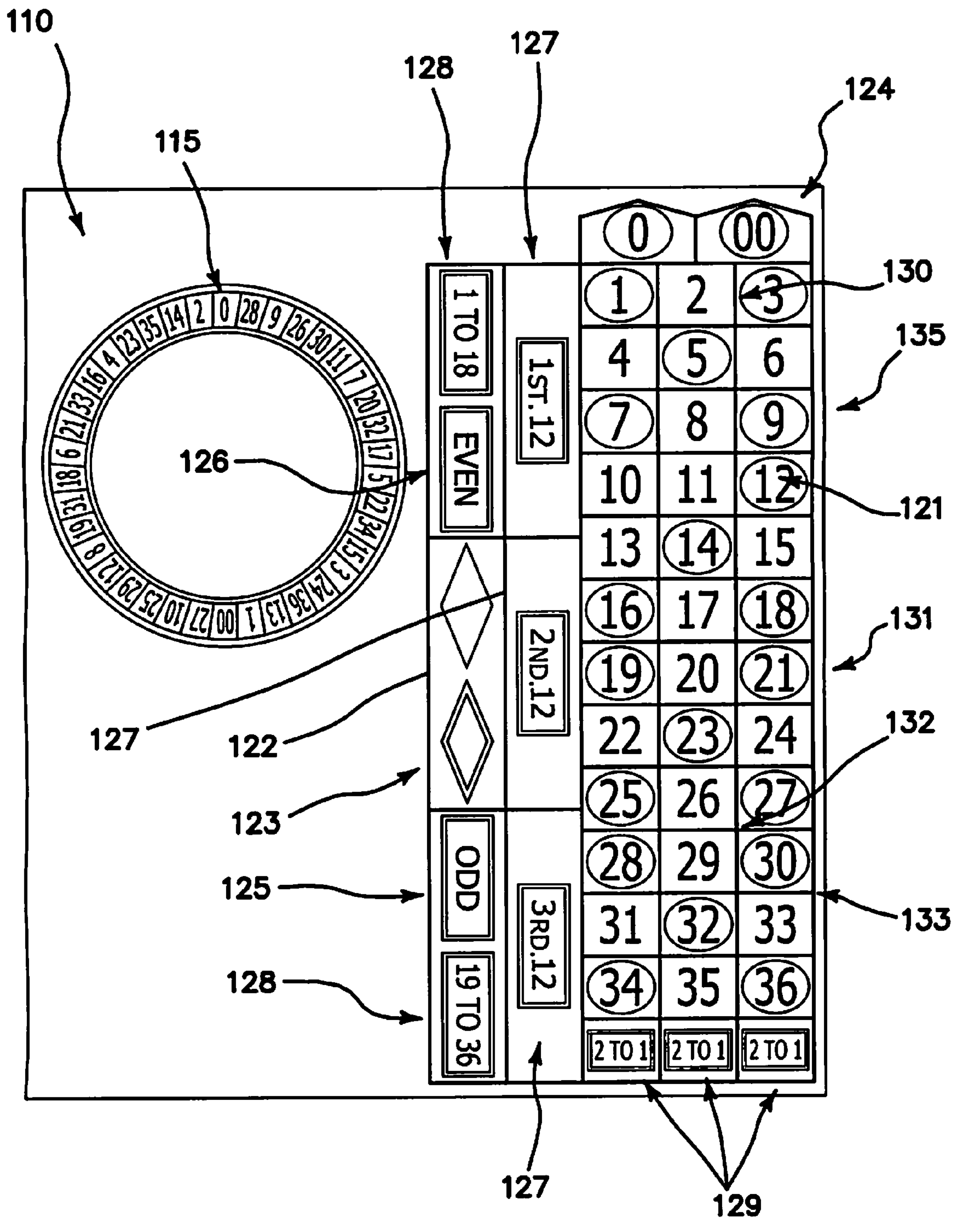
FIG. 1 shows a conventional prior art roulette game table comprising a wheel and layout for a double zero roulette game.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Reference is now made to the figures wherein like parts are referred to by like numerals throughout. FIG. 1 shows a conventional prior art roulette game table 100 comprising a wheel 110, having 38 numbered compartments 115 (1-36, "0" and "00"), and layout 135 for a double zero roulette game. The popularity of roulette is in part based on its simplicity. Players first make wagers by placing chips, cheques or cash on the layout 130 at locations identifying their desired wagers. Wagers can be made on single numbers 121, red numbers 122, black numbers 123, green numbers 124, odd numbers 125, even numbers 126, blocks of 12 numbers 127, blocks of 18 numbers 128 and/or columns of 12 numbers 129. Players may also place wagers on two numbers by placing a chip between the two numbers 130; on three numbers by placing a chip at the end of a row 131; on four numbers by placing a chip at the corner of four numbers 132; and/or on six numbers by placing the chip between the end of two rows 133. Once all wagers are placed, the dealer or croupier spins the roulette ball around a wall and rim circumscribing the roulette wheel 110. If necessary, the dealer or croupier also spins the roulette wheel 110 in the opposite direction. Initially, the roulette ball spins around the wall, prevented from exiting the apparatus by the rim along an upper edge of the wall. Eventually the roulette ball lands in a numbered compartment 115 which determines the roulette game outcome. Wagers are resolved based on the number and color combination and the corresponding payouts. Other than the incorporation of the green "0" and "00" compartments on the roulette wheel 110, the conventional game of roulette has not changed significantly during its long history.

Figure 2:
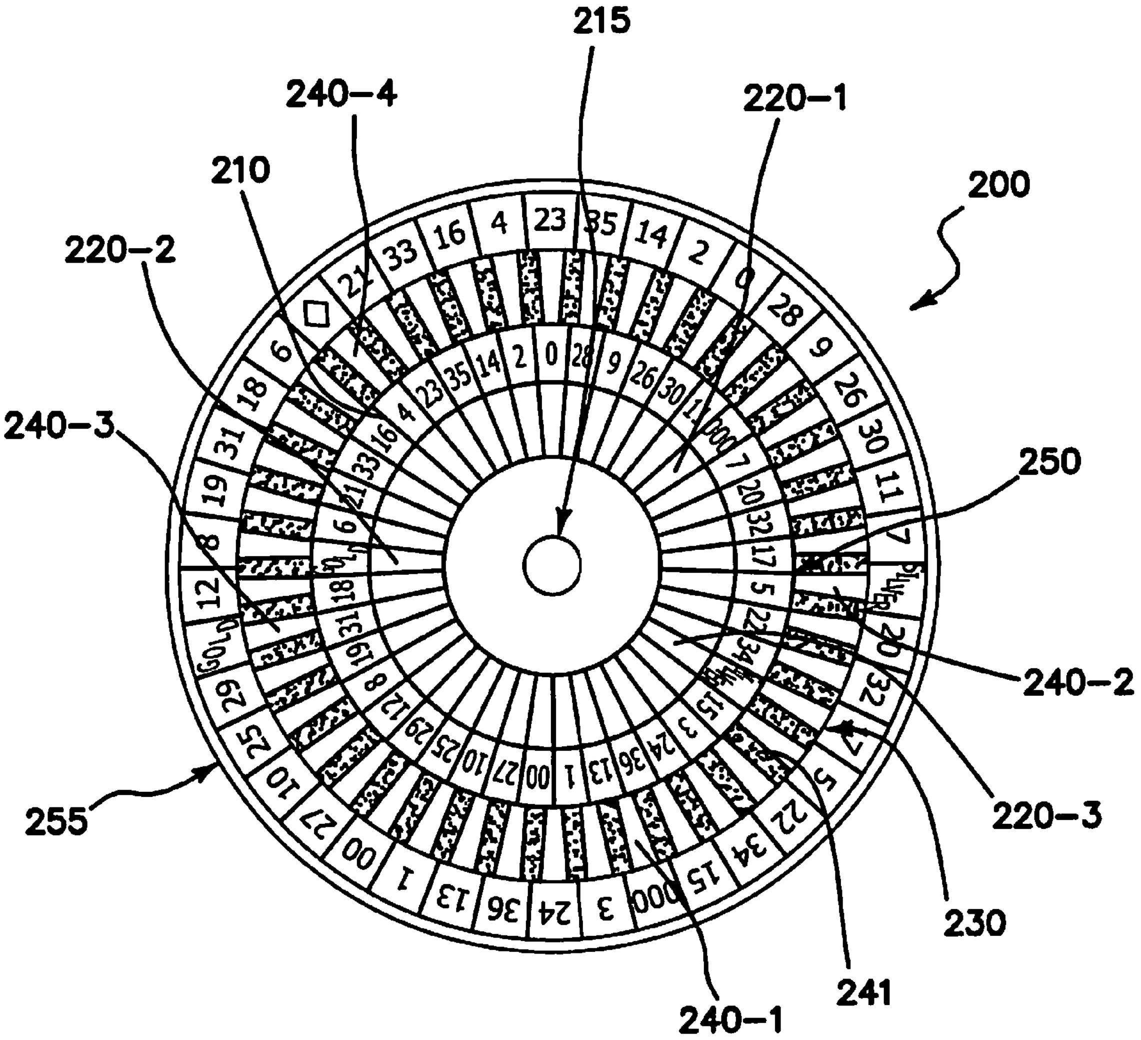
FIG. 2 shows an upper view of a system having two independent roulette wheels according to a first embodiment of the present invention.

FIGS. 2 and 3 show an upper view and cross-sectional views, respectively, of a roulette wheel apparatus 200 according to a first embodiment of the present invention. A first roulette wheel 210 is centrally positioned within a second roulette wheel 220. The two roulette wheels 210, 230 are independent of one another such that each roulette wheel 210, 230 may be spun separately in the same or opposite directions. The inner, first roulette wheel 210 is generally in the form of a conventional roulette wheel albeit with additional compartments as discussed in more detail below. The outer, second roulette wheel 230, circumscribes the inner, first roulette wheel 210. Like the first roulette wheel 210, the second roulette wheel 230 is generally in the form of a conventional roulette wheel albeit with additional compartments as discussed in more detail below.

In a first embodiment, the inner roulette wheel 210 is generally a conventional roulette wheel having a rotatable roulette surface defining a series of numbered compartments 220 into which a roulette ball may land thereby identifying a roulette number and color 225. A spinning means 215 extends upward from the first roulette wheel 210 in a conventional fashion. The second, outer roulette wheel 230 has a roulette surface defining a series of numbered compartments 240 into which the roulette ball may land thereby identifying a roulette number and color 245. A small wall or barrier 250 divides the numbered compartments 220 of the inner roulette wheel 210 from the numbered compartments 240 of the outer roulette wheel 230. Spinning the second, outer roulette wheel 230 may be accomplished by using a finger against one of the spacers 241 separating the compartments 240.

Figure 3A:
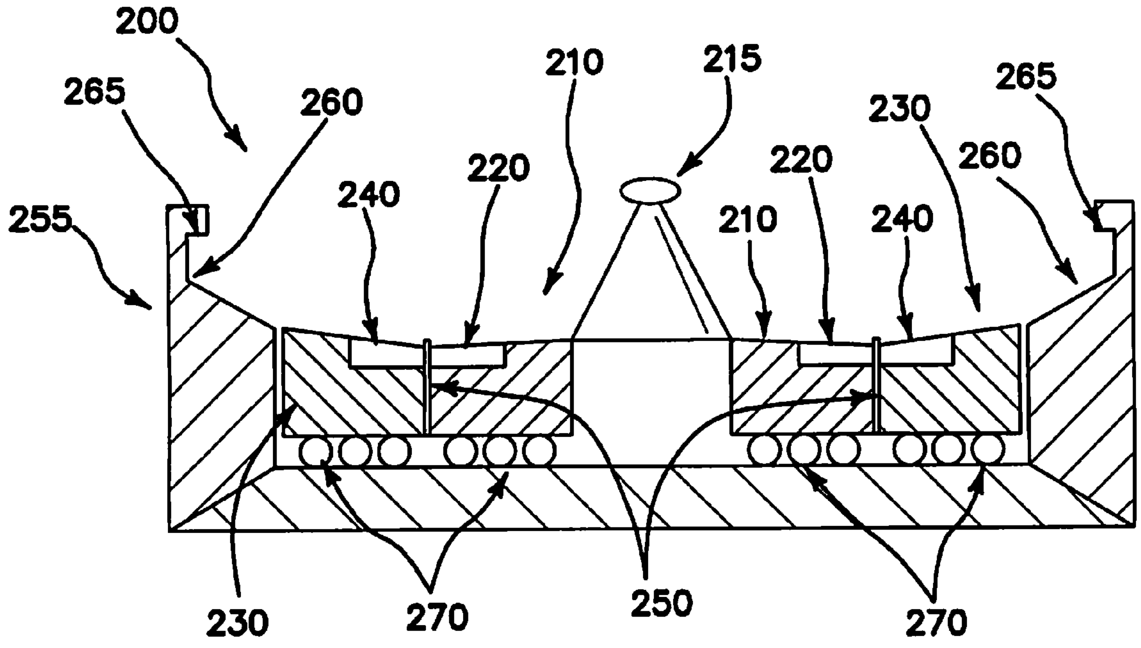
FIGS. 3*a* and 3*b* show cross-sectional views of two exemplary configurations of the apparatus having two independent roulette wheels.
Figure 3B:
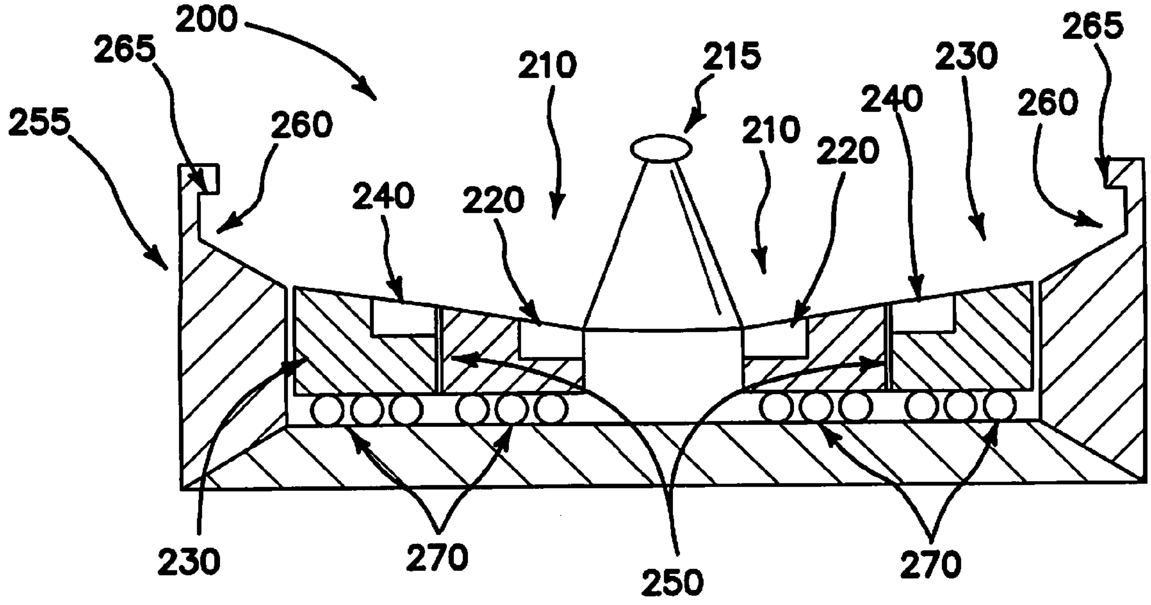

A housing 255, which retains the roulette wheels 210, 230, defines an inner wall 260 and rim 265 along a top edge thereof. The inner wall 260 and rim 265 allows a roulette ball to be spun in a conventional manner. A series of ball-bearings 270 or similar rotational members permit the roulette surface to spin freely within the housing 255 and about the inner roulette wheel 210. In this configuration the two roulette wheels 210, 230 can be spun independently in the same or opposite directions. Once the roulette ball loses momentum, the roulette ball falls into the portions of the roulette wheels 210, 230 having the numbered compartments 220, 240 and eventually one of said compartments 220, 240. To maintain equal probabilities, the compartments 220, 240 should be the same size. Consequently, the compartments of the roulette wheel 230 may include wider spacers 241 than the spacers 221 of roulette wheel 210. In other words, as the circumference of the roulette wheel 230 is larger than the circumference of the roulette wheel 230 it is necessary to fill in the additional area without increasing the size of the compartments 240 relative to compartments 220. As set forth below, in one embodiment of the present invention, the outer wheel 230 includes one more compartment than the inner wheel 210 such that the size of the spacers 241 may not need to be modified. Moreover, an inner wall 260 of the housing 255 may be more acutely angled than with conventional roulette wheels to provide the roulette ball with additional speed as it contacts the outer roulette wheel 230 so that the roulette ball is able to jump the barrier 250 to reach the first roulette wheel 210. The surface supporting the compartments 220, 240 may also be sloped or angled (as shown) rather than horizontal to further facilitate equally likely outcomes. FIG. 3*a* shows an embodiment with the roulette wheels 210, 230 sloped in the same direction downward from where the roulette ball will enter. Accordingly, the roulette ball is free to land in any of the compartments 220, 240. As shown, in FIG. 3*b*, the roulette wheels 210, 230 are sloped or angled downward towards one another to form a kind of trough for the roulette ball to bounce around in such it can land in compartments 220, 240 on either wheel 210, 230. The wheels 210, 230 may also be horizontal or oppositely sloped.

In one embodiment, the probability of the roulette ball landing in any given compartment 220, 240 is equal. However, it is conceivable that the roulette wheel apparatus 200 may be constructed such that the roulette ball may land in the compartments of one wheel 210, 230 a greater percentage of the time. With such embodiment, the payouts must be adjusted accordingly.

In one embodiment, each roulette wheel 210, 230 is modified to include additional compartments. In a first embodiment, the inner roulette wheel 210 includes the conventional 1-36, "0" and "00" compartments, but is modified to include a "000" compartment 220-1, Gold compartment 220-2 and Silver compartment 220-3. Accordingly, the inner roulette wheel 210 is comprised of 41 compartments 220. The outer roulette wheel 230 includes the conventional 1-36, "0" and "00" compartments, but is modified to include a "000" compartment 240-1, Silver compartment 240-2, Gold compartment 240-3 and Diamond compartment 240-4. Accordingly, the outer roulette wheel 230 is comprised of 42 compartments 240. Alternatively, the inner roulette wheel 210 includes the Diamond compartment 240-4 rather than the outer roulette wheel 230. The additional compartments create more outcomes and allows a jackpot wager and payout to be implemented. Those skilled in the art will recognize that different compartments may be incorporated and they can be color-coded or designated in any manner. The added compartments and corresponding designations may be added to the conventional roulette wheel in any fashion desired. In other words, the new compartments may be spaced such that the conventional roulette numbers are in the same general order albeit with the new compartments interspersed or the conventional numbers may be scrambled into an entirely new order.

In one embodiment, the compartments 220, 240 which are adjacent to one another, are separated by an elevated, stationary, separating barrier 250 positioned between the two roulette wheels 210, 230. Alternatively, outer walls of each compartment 220, 240 are fabricated of high tolerances such that the roulette wheels 210, 230 spin independently without interference from one another.

Figure 4:
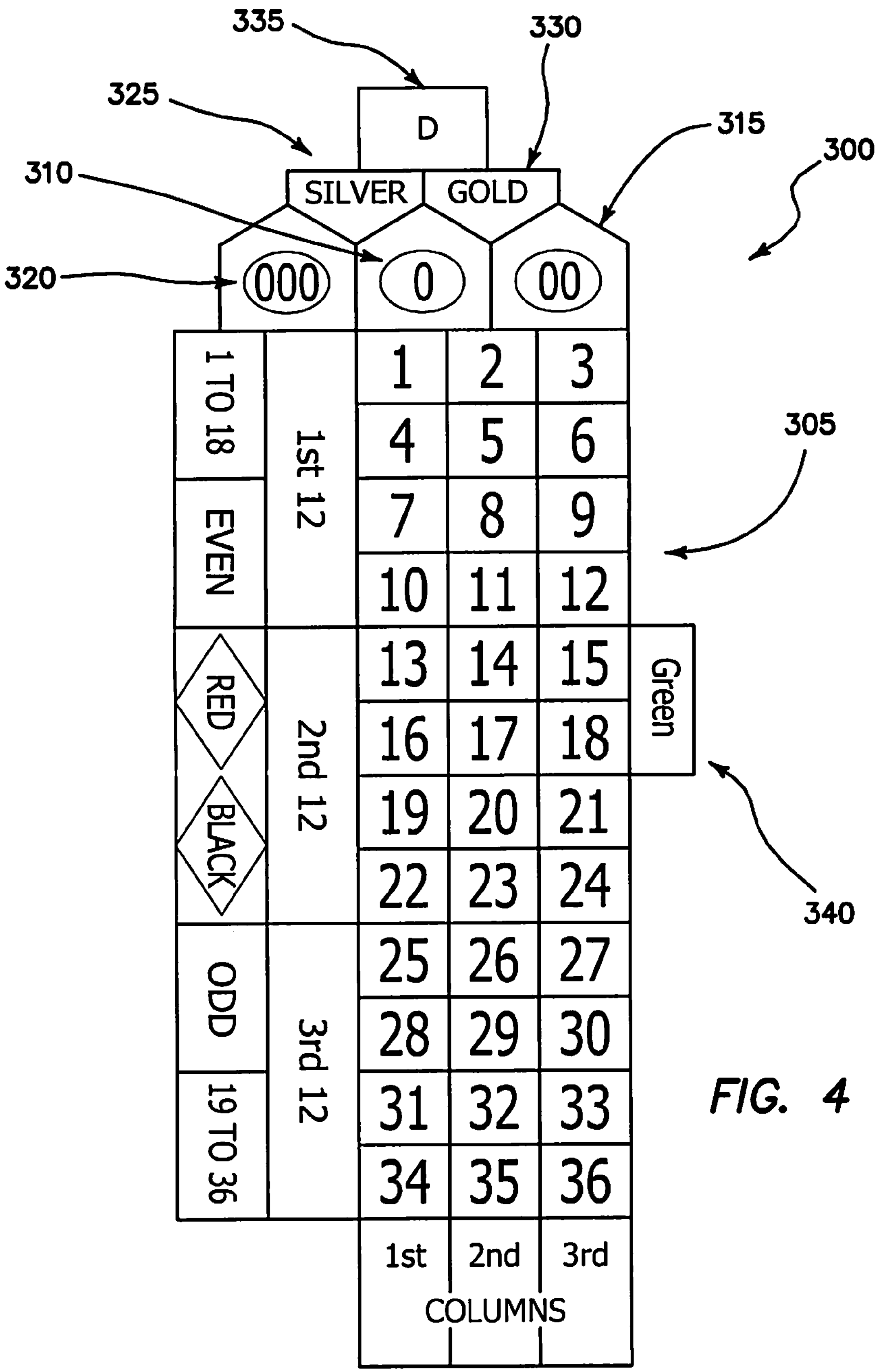
FIG. 4 shows a modified layout according to a first embodiment of the present invention.

FIG. 4 shows a layout 300 corresponding to the inclusion of the new compartments. The layout 300 includes the conventional 1-36 numbered wager areas 305, "0" wager area 310 and "00" wager area 315. Additional wager areas, include the "000" wager area 320, Silver wager area 325, Gold wager area 330 and Diamond wager area 335. There is also an added green wager area 340 covering "0," "00," and "000" outcomes. The wager may also be placed as a line wager by placing a chip partially in the "000" wager area 320 or "00" wager area in a conventional line wager manner. Those skilled in the art will recognize that the layout 300 may take many forms as long as the additional wager areas 320-335 are available for the placement of wagers. As detailed below, each outcome, expect for the Diamond outcome, is possible on either roulette wheel 210, 230.

In one embodiment, all single number (1-36, "0," "00" and "000") or color wager (Gold, Silver) areas, except for the Diamond wager area, result in the same payout. That is, the probability of the roulette ball landing in each numbered compartment, Gold compartment and Silver compartment is identical at 2⁄83 or 2.41%. In one embodiment, the payout for a wager on any single number or color outcome is in a range of 36-1 to 41-1. The exact payout to be determined by casinos offering the game. The probability of the ball landing in the Diamond compartment is $\frac{1}{83}$ or 1.20%. In one embodiment, a payout range of 70-1 to 82-1 corresponds to a non-jackpot wager placed in the Diamond wager area 335.

Because of the low probability of the ball landing in the single Diamond compartment 240-4, the Diamond compartment 240-4 can be used to implement a jackpot feature. The jackpot feature is based on the roulette ball landing in the Diamond compartment 240-4 on two or more consecutive spins of the roulette wheels 210, 230. For reference, the probability of the roulette ball landing in the Diamond compartment 2404 on consecutive spins is calculated as: $\frac{1}{83}\times\frac{1}{83}=\frac{1}{6889}$ or 0.015%.

In one embodiment, players are able to place a jackpot wager by placing chips, cheques or cash on the Diamond wager area 335. There may be minimum wager amounts (e.g., in minimal increments of $5) required for the jackpot wager. If on the next spin, the roulette ball lands in the Diamond wager compartment 240-4, the jackpot wager remains active and the dealer identifies or marks the jackpot wager with a jackpot disc/marker depicting a numeral "1" signifying a first Diamond outcome so that the dealer and players know which wagers are active for the following spin and to separate the active jackpot wagers from new jackpot wagers which are not identified or marked. Other means for identifying or marking the wagers are conceivable. If on the next spin the roulette ball lands in the Diamond compartment 240-4, the players having placed the initial jackpot wagers receive a jackpot payout. In one embodiment, the jackpot results in a fixed odds payout (e.g., 100 to 1). In an alternative embodiment, the jackpot results in payout based on an ever-increasing progressive figure. Progressive jackpots are well known in the industry and essentially grow from a base amount until they are won at which point they reset to the base amount. The progressive jackpots are typically funded using a percentage of jackpot wagers placed during play of the underlying game. In this embodiment, if multiple players win the jackpot, they win an equal share of the current progressive figure. In either embodiment, there may be a smaller, non-jackpot payout responsive to the roulette ball landing in the Silver compartment 240-2 and Gold compartment 240-3 on the spin after the roulette ball landed in the Diamond compartment 240-4. For example, the payout may be based on smaller fixed odds (e.g., 3 to 1) or a percentage (e.g., 5%) of the current progressive figure. In one embodiment, a wager placed in the Diamond wager area 335 is also subject to a non-jackpot payout based on a Diamond outcome. If, the Diamond outcome occurs on the first spin, the non-jackpot payout (e.g., 50-1) may be deferred until after the next spin to determine if the jackpot is won. If the jackpot is won, the non-jackpot payout may be forfeited in lieu of the jackpot payout and if the jackpot is not won, the non-jackpot payout is made.

If the roulette ball lands in the Diamond compartment 240-4 on two consecutive spins, the players are paid the jackpot and any progressive is reset, and the initial jackpot wagers placed immediately prior to the first Diamond outcome remain active and are identified or marked with a disc depicting a numeral "2" signifying a second consecutive Diamond outcome while jackpot wagers placed immediately prior to the second Diamond outcome are identified or marked with the disc depicting the numeral "1," such that the jackpot wagers may be tracked. The same procedure occurs responsive to three or more consecutive Diamond outcomes. In other words, jackpot wagers remain active for each consecutive Diamond outcome such that a player may win successive jackpots. If the successive jackpots are based on a progressive, a first jackpot payout would be based on the current progressive amount and a second jackpot would be for the reset amount.

It is also possible with the embodiments of the present invention to create a network of apparatuses 200 to generate more excitement and even larger progressive jackpots. The network may be limited to commonly owned casino properties or may extend across multiple casino properties having different owners. For example, a network may include one hundred linked apparatuses 200 across 20 casinos having different owners. Accordingly, a progressive jackpot can be funded by jackpot wagers placed on any of the apparatuses 200 across the network such that a large progressive jackpot may be built quickly.

The embodiments of the present invention generate additional excitement to roulette which has remained essentially unchanged for centuries. The excitement is generated by adding two wheels and two chances to win on most number outcomes, adding additional wager options, increasing payouts and facilitating a jackpot feature.

While a physical roulette game apparatus is detailed above, those skilled in the art will recognize that the roulette game apparatus and method of using the same may be used to facilitate an electronic games of chance and online games of chance. For example, an electronic game of chance (processor driven) premised on the embodiments of the present invention may include a simulated apparatus and layout as detailed herein. The player is then able to place the same wagers as the live game by inserting cash, coupons or the like. Once the wagers are placed, the player activates the game such that a random outcome is simulated. The outcome is used to resolve wagers. The jackpot feature can similarly be implemented. An online version is generally operated in the same manner. A hand-held device (e.g., cellular telephone) may also be used to deliver the game to players.

Although the invention has been described in detail with reference to several embodiments, additional variations and modifications exist within the scope and spirit of the invention as described and defined in the following claims.

I claim:

1. A method of conducting a roulette game comprising the steps of:

providing a roulette system including a first roulette wheel, second roulette wheel, only a single roulette ball and a roulette game wager layout the first roulette wheel is centrally positioned within said second roulette wheel circumscribing said first roulette wheel;

allowing players to place wagers on outcomes of the roulette game as generated by a first roulette wheel and a second roulette wheel forming a single unit;

once wagers have been placed, spinning said single roulette ball about said first roulette wheel and said second roulette wheel wherein said first roulette wheel includes a first plurality of ball compartments associated with first plurality of roulette numbers and/or colors and said second roulette wheel includes a second plurality of ball compartments associated with a second plurality of roulette numbers and/or colors, said first roulette wheel and said second roulette wheel having an unequal number of compartments; and resolving said wagers based on which ball compartment from said first plurality of ball compartments and said second plurality of ball compartments into which said single roulette ball lands.

2. The method of claim 1 further comprising including one or more additional compartments on said first roulette wheel relative to said second roulette wheel.

3. The method of claim 1 further comprising including one or more additional compartments on said second roulette wheel relative to said first roulette wheel.

4. The method of claim 1 further comprising accepting jackpot wagers based on two or more consecutive same outcomes.

5. The method of claim 4 further comprising providing a fixed odds jackpot payout or progressive jackpot payout.

6. The method of claim 1 further comprising utilizing an electronic gaming device, computer network or hand-held device to deliver the roulette game to a player.

7. A gaming apparatus comprising:

a first roulette wheel including a first plurality of ball compartments associated with a first plurality of roulette numbers and/or colors;

a second roulette wheel including a second plurality of ball compartments associated with a second plurality of roulette numbers and/or colors;

only a single roulette ball; and the first roulette wheel is centrally positioned within said second roulette wheel circumscribing said first roulette wheel, said first roulette wheel and said second roulette wheel have an unequal number of compartments, the first and second roulette wheels form a single unit and are independent of one another such that the first and second roulette wheels may spin independently and wherein the first roulette wheel and second roulette wheel are configured to allow the single roulette ball to land in a compartment from either the first plurality of ball compartments or the second plurality of ball compartments.

8. The gaming apparatus of claim 7 wherein said first roulette wheel and said second roulette wheel may spin in the same or opposite directions.

9. The gaming apparatus of claim 7 wherein one of said roulette wheels includes forty-one compartments designated 1-36, “0”, “00”, “000”, silver and gold, and wherein said other roulette wheel includes forty-two compartments designated 1-36, “0”, “00”, “000”, silver, gold, and diamond.

10. The gaming apparatus of claim 7 wherein said compartments of said first roulette wheel and said second roulette wheel are adjacent to one another and separated by a level barrier.

11. The gaming apparatus of claim 7 wherein said first and second roulette wheels are sloped downward from an outer portion to an inner portion.

12. The gaming apparatus of claim 7 wherein said first and second roulette wheels are sloped inward toward one another or outward away from one another.

13. A gaming apparatus comprising:

a first roulette wheel centrally positioned relative to a second roulette wheel circumscribing said first roulette wheel, said first and second roulette wheels configured to spin independently of one another;

only a single roulette ball; and a first plurality of roulette ball compartments associated with said first roulette wheel and second plurality of roulette ball compartments associated with said second roulette wheel , said first roulette wheel and said second roulette wheel having an unequal number of compartments, said first plurality of roulette ball compartments and said second plurality of roulette ball compartments positioned relative to one another such that said single roulette ball is able to land in any compartment from either said first plurality of roulette ball compartments or said second plurality of roulette ball compartments.

14. The gaming apparatus of claim 13 wherein said first roulette wheel and said second roulette wheel may spin in the same or opposite directions.

15. The gaming apparatus of claim 13, wherein one of said roulette wheels includes forty-one compartments designated 1-36, “0”, “00”, “000”, silver and gold, and wherein said other roulette wheel includes forty-two compartments designated 1-36, “0”, “00”, “000”, silver, gold and diamond.

16. The gaming apparatus of claim 13 wherein said compartments of said first roulette wheel and said second roulette wheel are adjacent to one another and separated by a level barrier.

17. The gaming apparatus of claim 13 wherein said first and second roulette wheels are sloped downward from an outer portion to an inner portion.

18. The gaming apparatus of claim 13 wherein said first and second roulette wheels are sloped inward toward one another or outward away from one another.

19. An electronic gaming device comprising:

a display, a player interface and wager accepting means, and a processor for executing a set of programmable instructions capable of being executed by said processor for playing a roulette game, said roulette game including the steps of:

displaying a first simulated roulette wheel having a first series of numbered and/or colored compartments adapted to receive only a single simulated roulette ball;

displaying a second simulated roulette wheel having a second series of numbered and/or colored compartments adapted to receive said single simulated roulette ball , said first simulated roulette wheel is centrally positioned within said second simulated roulette wheel circumscribing said first roulette wheel, said first simulated roulette wheel and said second simulated roulette wheel having an unequal number of compartments;

crediting one or more player wagers;

independently activating said first roulette wheel and said second wheel to generate a game outcome dependent upon a compartment from said first series of numbered and/or colored compartments or said second series of numbered and/or colored compartments into which said single simulated roulette ball lands; and resolving said one or more player wagers responsive to said game outcome.

20. The electronic gaming device of claim 19 further comprising said gaming device programmed to track a jackpot feature dependent upon said simulated roulette ball identifying a pre-designated game outcome on successive plays of the gaming device.

* * * * *